(12) United States Patent　　(10) Patent No.:　　US 12,392,447 B1
Robertson Pim　　(45) Date of Patent:　　Aug. 19, 2025

(54) TRIPOD-STABILIZING WEIGHT PLATES

(71) Applicant: Scott Robertson Pim, Epping, NH (US)

(72) Inventor: Scott Robertson Pim, Epping, NH (US)

( * ) Notice: Subject to any disclaimer, the term of this patent is extended or adjusted under 35 U.S.C. 154(b) by 0 days.

(21) Appl. No.: 18/432,012

(22) Filed: Feb. 4, 2024

(51) Int. Cl.
　　*F16M 11/00*　　(2006.01)
　　*F16M 11/24*　　(2006.01)

(52) U.S. Cl.
　　CPC ....... F16M 11/247 (2013.01); *F16M 2200/04* (2013.01); *F16M 2200/08* (2013.01)

(58) Field of Classification Search
　　CPC ............ F16M 11/247; F16M 2200/04; F16M 2200/08
　　See application file for complete search history.

(56) References Cited

U.S. PATENT DOCUMENTS

| 5,222,708 | A | 6/1993 | McLellan |
| 6,108,194 | A | 8/2000 | Seligman |
| 6,688,566 | B1 | 2/2004 | Crain |
| 6,981,680 | B1 * | 1/2006 | Gordon ................ E04H 15/58 |
| | | | 248/910 |
| 7,608,021 | B1 | 10/2009 | Nalley |
| 8,573,609 | B1 | 11/2013 | Moser |
| 9,051,755 | B2 * | 6/2015 | Heining ............. E04H 12/2253 |
| 10,458,133 | B2 * | 10/2019 | Davis .................... E04H 17/009 |
| 2007/0290104 | A1 | 12/2007 | Denison |
| 2011/0042531 | A1 | 2/2011 | Hughes |
| 2011/0180679 | A1 * | 7/2011 | Ma ........................ G09F 15/00 |
| | | | 248/346.01 |
| 2021/0372562 | A1 | 12/2021 | Kopty |

* cited by examiner

*Primary Examiner* — Amy J. Sterling
(74) *Attorney, Agent, or Firm* — Patent Negotiator, PLLC; Sarita Pickett

(57) ABSTRACT

A stabilizing weight for tripods is formed from a rectangular plate with handles and latches. When a set of three weights are stacked in a container for transport, the handle height and the position of the latches prevents the latches from interfering, regardless of the stacking order.

11 Claims, 7 Drawing Sheets

TRIPOD-STABILIZING WEIGHT PLATES

FIELD OF THE INVENTION

This invention relates to tripods or stands, used in fields such as photography, cinematography, geomatics, civil engineering, building construction, land surveying, industrial metrology, or astronomy.

The present invention relates to a device to stabilize and prevent tipping of stands for measuring, surveying, optical, photographic, video, cinema, or similar equipment.

BACKGROUND OF THE INVENTION

Tripods and stands are widely used for supporting optical and electronic instruments for photography, cinematography, astronomy, measuring, observing, and collecting Global Positioning System satellite data. Especially in the land surveying and engineering fields, the tripod needs to hold a secure position on all kinds of surfaces and in all weather conditions. If a tripod slips or vibrates, measurements can be compromised. If a tripod is knocked over, costly equipment can be damaged.

Tripods are usually designed to be lightweight in order to ease transport. However, they can then be easily moved by an accidental kick or tipped over by wind. Users commonly improvise materials such as sandbags or heavy chain to weigh down tripod legs. Some commercially available products include plastic pipe sections that can be filled with sand and attached with straps. Another commercially available product consists of specially shaped cast iron weights that only fit on the feet of one specific tripod product. Prior art weight devices include fabric pouches with straps. Another device consists of heavy discs positioned below the tripod feet and fastened with straps.

SUMMARY OF THE INVENTION

Existing solutions that involve textile material or straps are not durable, and are difficult to attach. Existing solutions that incorporate plastic housings or use lower density granular or modular weight material result in a non-compact shape which can increase the tripping hazard. Existing solutions are difficult to package for storage and transport. Therefore, it would be beneficial to provide a method for increasing the stability of tripods and stands that is fast and easy to attach, while also being compact, durable, and easy to transport and store. An object of the instant invention is to overcome the stated difficulties of the prior art by providing an improved compact stabilizing weight for equipment stands. Another object of the instant invention is to provide a stabilizing weight that has a durable, easy to use latch. Yet another object of the instant invention is to provide a method of stacking a set of weights with latches that do not interfere. Still another object of the instant invention is to provide stacked weights in an easy to carry container.

The objects of the instant invention are accomplished through the use of a rectangular dense material plate that includes two handles and two latches. The handles are positioned and sized to create clearance space between the plates for the latches when the plates are stacked for transport. The handles are also useful for carrying the plate and as a pedal for firmly placing a tripod. The latches are positioned near the center of the plate to allow either end up while mounting on a tripod leg. The latches are also positioned in a slightly different pattern in each plate to prevent the latches from interfering when the plates are stacked, regardless of the stacking order.

In one embodiment, the latches are tensioned with coil springs. In another embodiment, the latches are threaded and tensioned with wing nuts.

The leg weights of the instant invention are superior to other leg weights on the market because of their compact size, durable simple construction, ease of placing and attaching, and ease of storing and transport.

DESCRIPTION OF THE INVENTION

Figure 1:
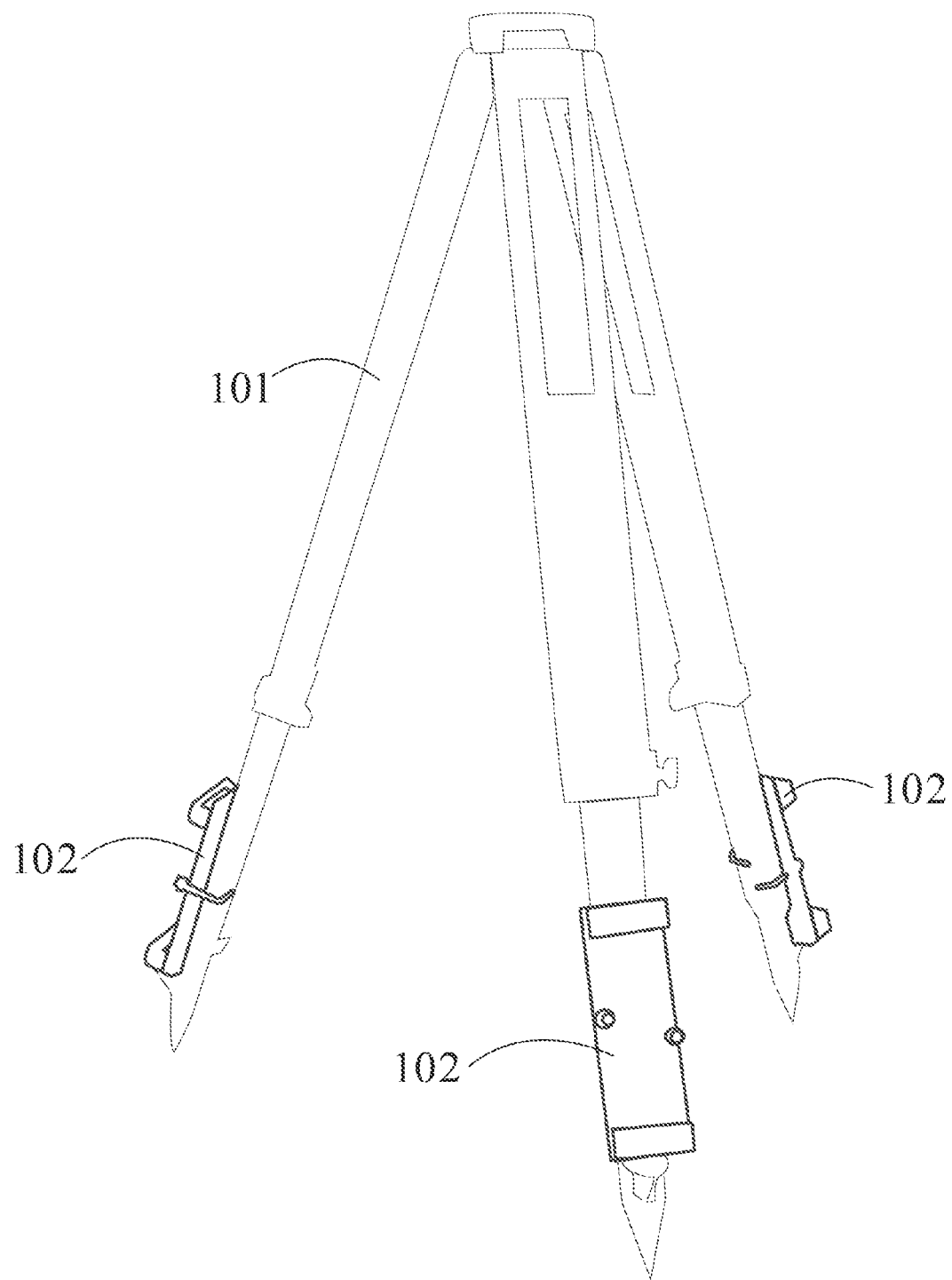
FIG. 1 shows a typical tripod with three leg weights of the present invention attached.

FIG. 1 shows a typical tripod stand. The tripod 101 being usually made of lightweight materials is easily tipped over. Attaching the instant invention leg weights 102 to the lower part of the tripod provides low center of gravity and thereby increases stability.

Figure 2:
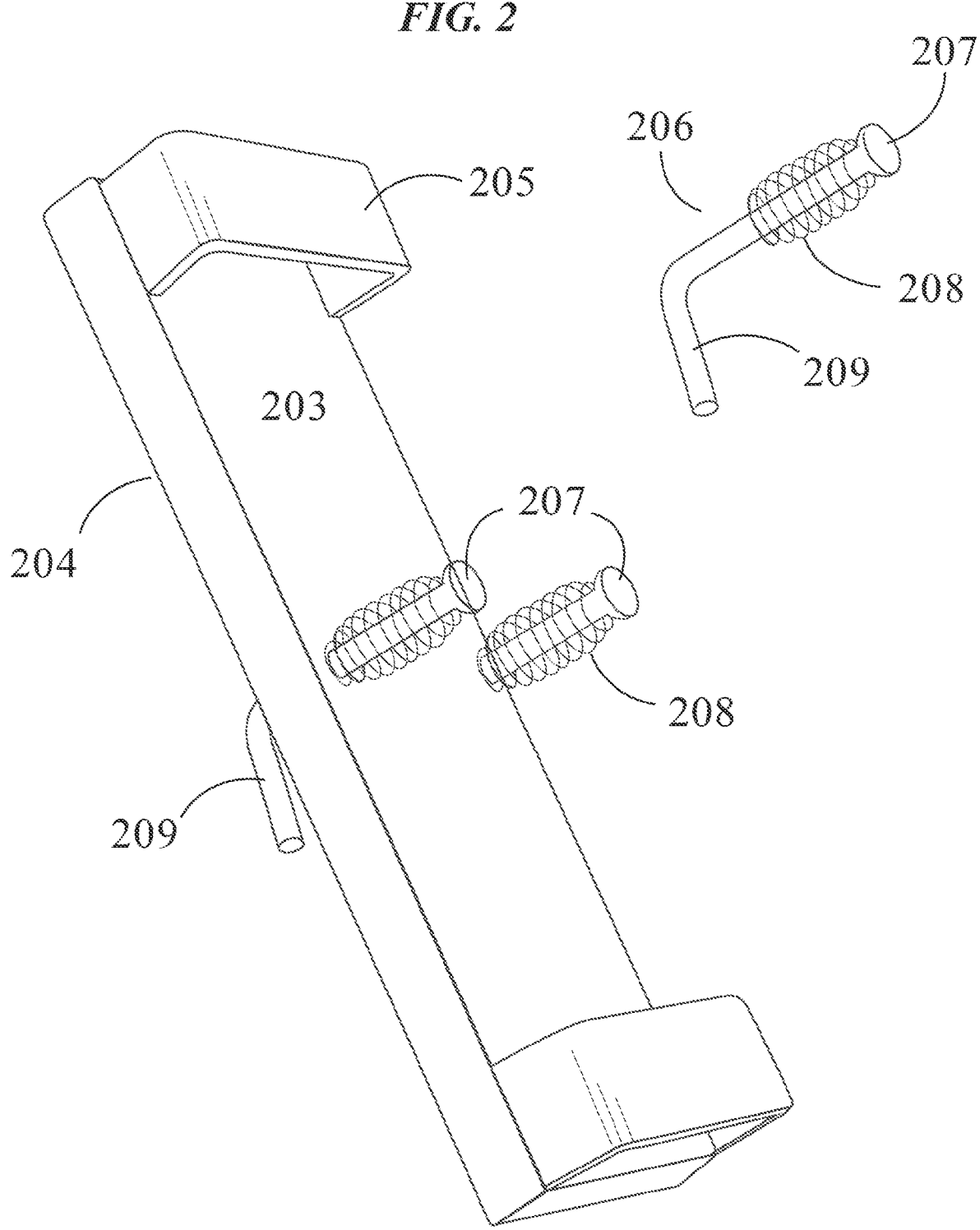
FIG. 2 shows a single leg weight assembly.

Each leg weight (FIG. 2) consists of a rectangular solid plate of dense material with a top side 203 and a bottom side 204. There is a handle 205 on the top side at each end. Each handle is formed as a rectangular loop on the top side of the plate. The handles function for carrying the plates and as pedals to embed the tripod in the ground and also as spacers when stacking the leg weights for storage or transport. Quick action latches 206 pass through holes in the plate from top to bottom, near the midpoint of the long edge. The latch consists of a rod with an enlarged head 207 tensioned by a spring 208 on the top side of the plate and a right angle section 209 protruding from the bottom side. The freely rotatable latch allows the user to depress the head of the latch, compressing the spring and turning the angled latch, thus clasping the leg weight to the leg of the tripod.

Figure 3:
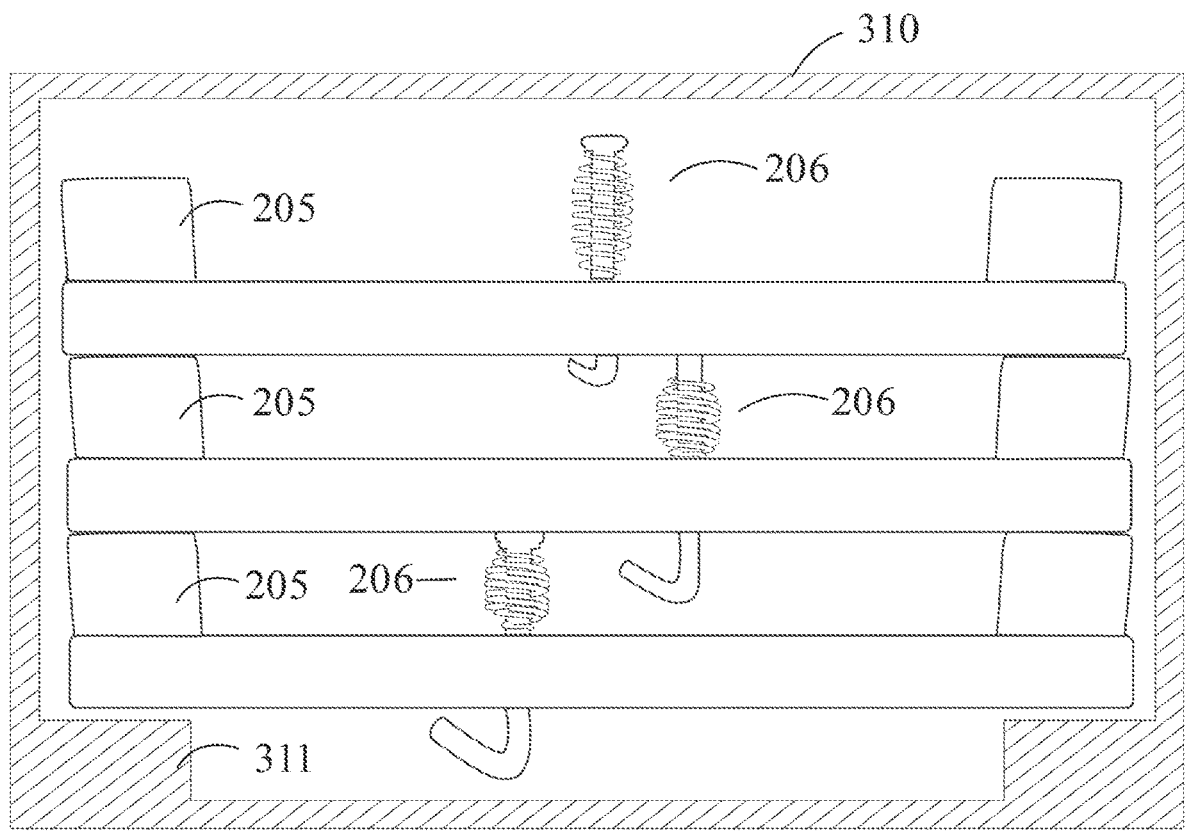
FIG. 3 is a cross-sectional view of a container with three leg weights stacked inside.

FIG. 3 shows three leg weights stacked inside of a container 310. The container has a spacer 311 to prevent the latches from contacting the bottom of the container. The handles 205 are sized to allow the leg weights to be stacked and partially compress the latches in that position. The handles and latches are sized such that the height of the latch does not exceed the combined height of the plate, its handles, and the handles of a plate below.

Figure 4:
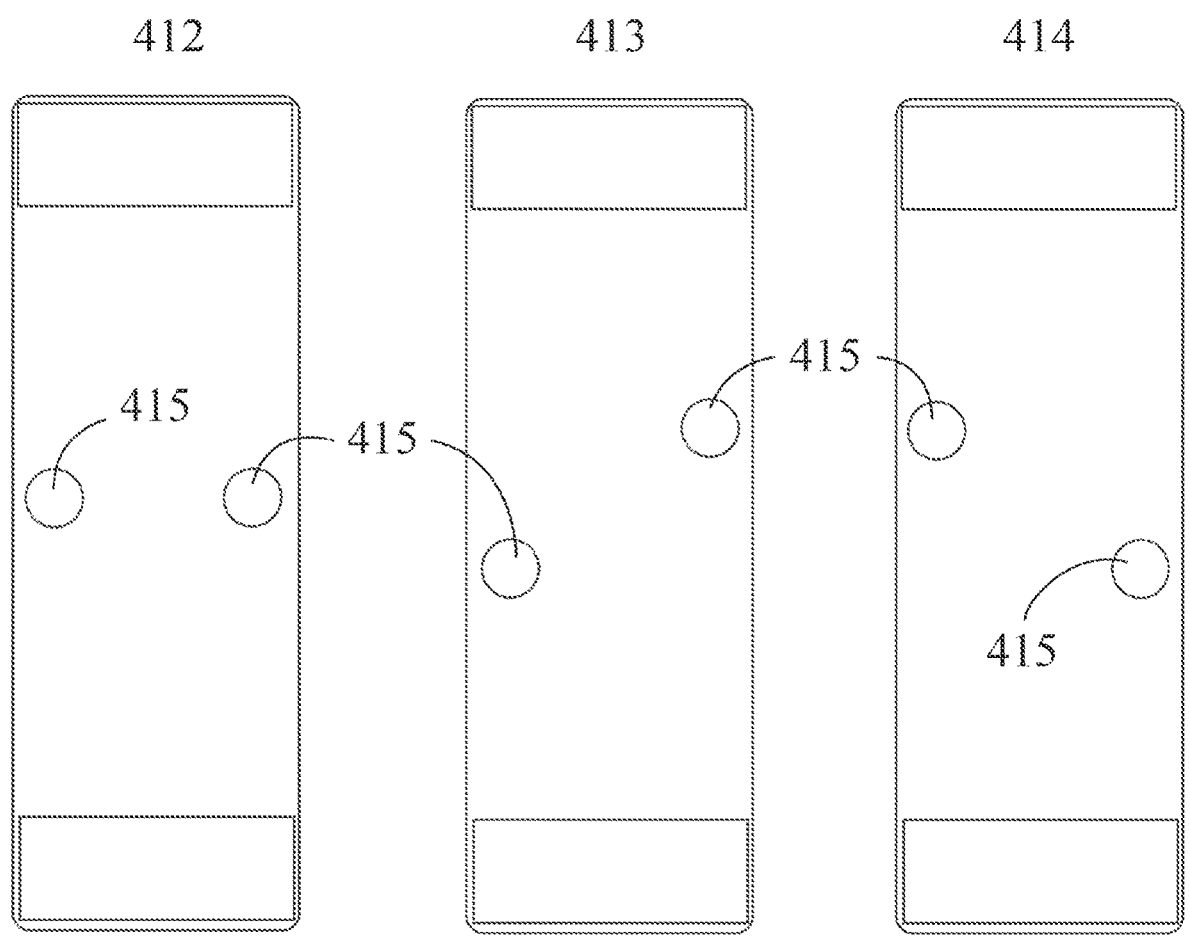
FIG. 4 is a top view of three leg weights.

FIG. 4 illustrates the location of the latch holes 415 on a set of three plates. The holes on plate 412 are located on the center line of the plate. The holes on plate 413 are offset in this view such that the left hole is below the center line and the right hole is above the center line. The holes on plate 414 are located in the opposite arrangement with the left hole above the center line and the right hole below the center line. The differing arrangement of the holes on a set of three plates allows them to be stacked in a carrying container as shown in FIG. 3. The holes will not be vertically aligned in the stack, regardless of stacking order, preventing interference between the latches. Also, the latch holes are close enough to the center line of the leg weights so the latches will function equally well with either end placed upwards on the tripod leg, as shown in FIG. 1

Figure 5:
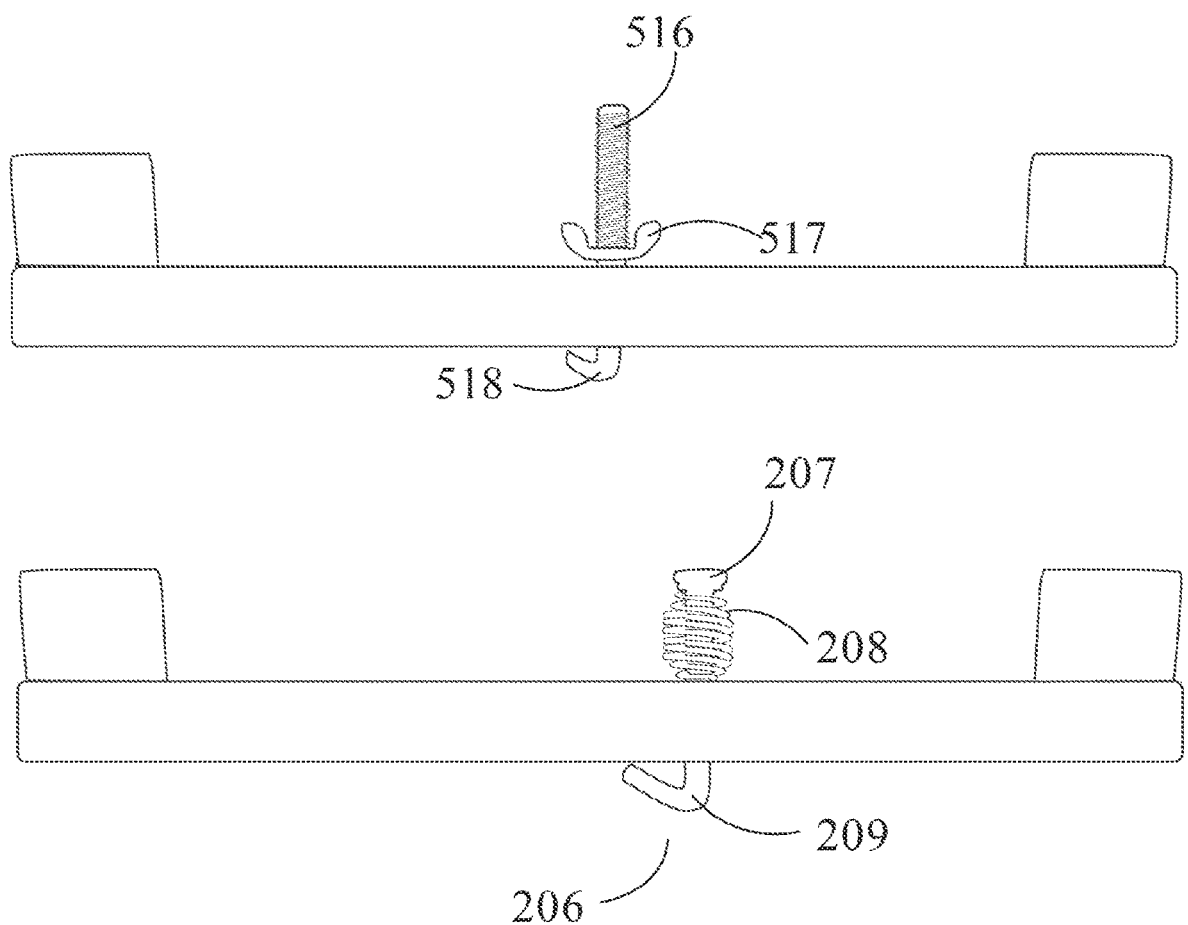
FIG. 5 indicates an alternative embodiment of the latch.

FIG. 5 shows an alternative embodiment of the latch. The latch consists of a rod with a threaded end 516 tensioned by a wing nut or knob 517 on the top side of the plate and a right angle section 518 protruding from the bottom side. The freely rotatable latch allows the user to loosen the nut, depress and turn the angled latch around the leg of the tripod, then tighten the nut, clasping the leg weight to the leg of the tripod.

Figure 6:
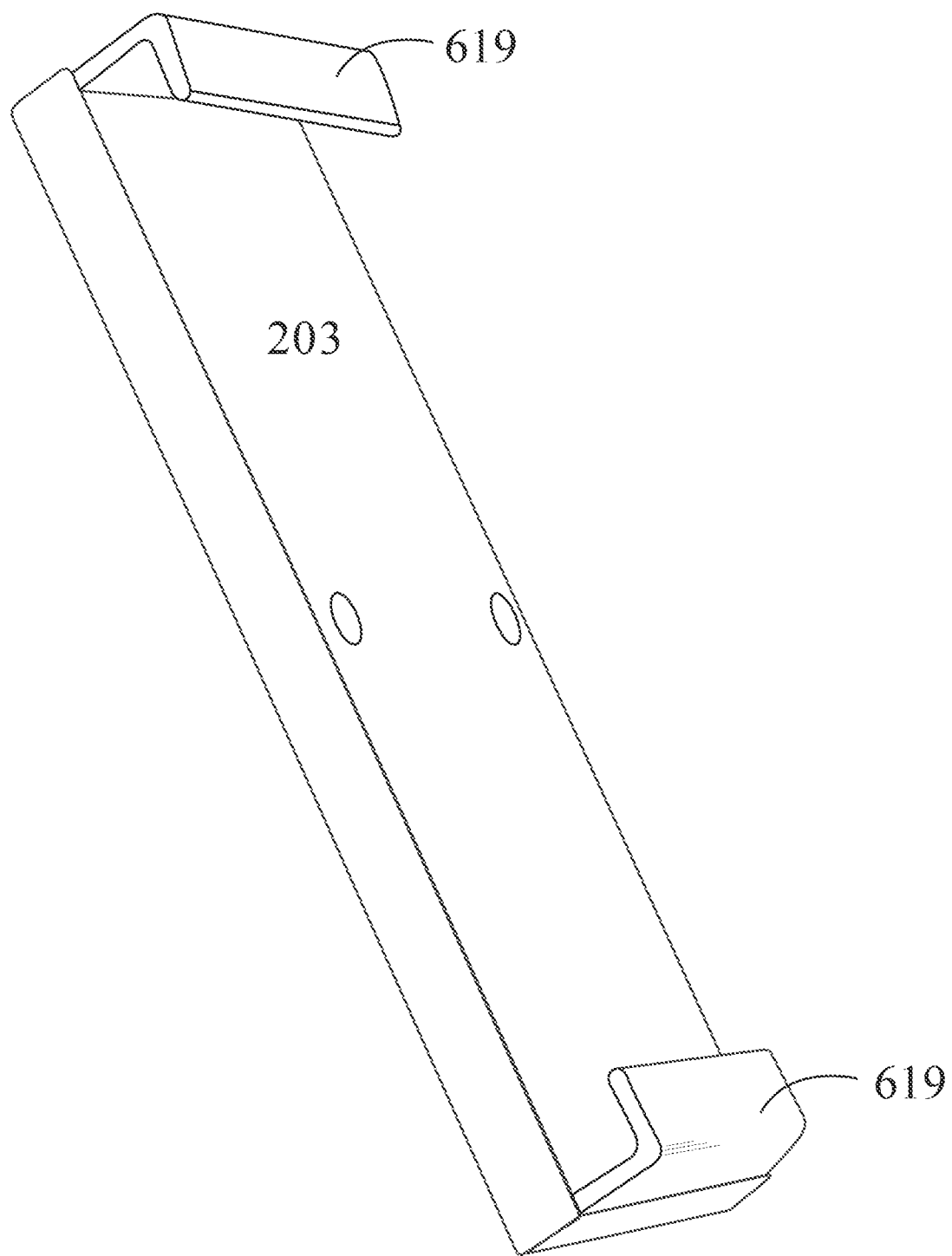
FIG. 6 is perspective view of an alternative embodiment of the handles.
Figure 7:
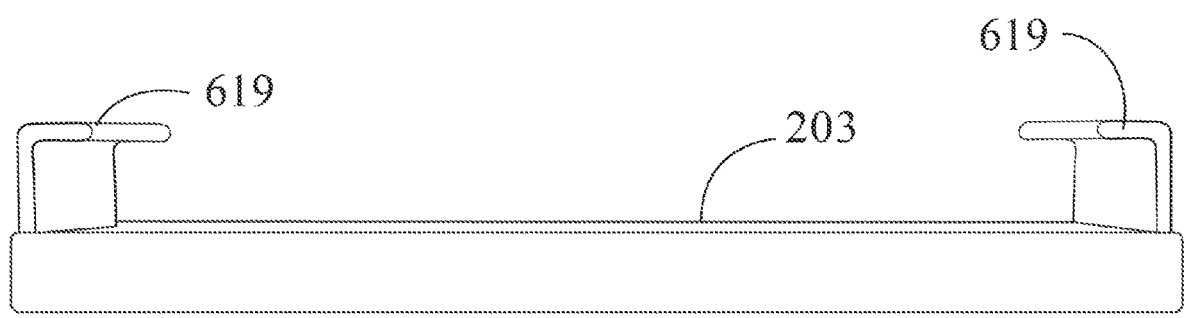
FIG. 7 is a side view of an alternative embodiment of the handles.

FIG. 6 and FIG. 7 show an alternative embodiment of the handles 619. The handles are right angle extrusion shapes fastened or formed on each end of the top surface 203 of the plate, and extend a pre-determined height above the top surface. These handles each create a channel that can be gripped with a users fingertips for lifting the weight plate. The handles also function as spacers to facilitate easy stacking for transport.

I claim:

1. A stabilizing weight set for stabilizing a tripod via parallel attachment to three legs of the tripod, the set comprising:
    a first heavy weight device constructed of solid material that can be attachably fixed to a first of the three legs of the tripod;
    a second heavy weight device constructed of solid material that can be attachably fixed to a second of the three legs of the tripod;
    a third heavy weight device constructed of solid material that can be attachably fixed to a third of the three legs of the tripod;
    wherein each of the first, the second, and the third heavy weight device comprising a respective first, second, and third rectangular plate each having a respective length, a width, a thickness, a top, a bottom, a length further having a first end, a center, and a second end, and a width further having a first edge and a second edge;
    wherein each of the first, the second, and the third heavy weight devices each further comprising two holes of a predetermined diameter extending from the top to the bottom through the respective first, the second, and the third rectangular plate;
    wherein each of the first, the second, and the third heavy weight devices each further comprising two latch mechanisms removeably installed in the respective two holes;
    wherein the stabilizing weight set comprising a first stabilizing configuration wherein each of the first, the second, and the third heavy weight devices are attachably fixed to a respective one of the three legs of the tripod via latching engagement of the respective two latch mechanisms with the respective one of the three legs of the tripod;
    wherein the stabilizing weight set comprising a second stacking configuration wherein each of the first, the second, and the third of the heavy weight devices are stacked vertically upon one another;
    wherein for the first rectangular plate, a first of these two holes being positioned along the center of the length and near the first edge of the width dimension, a second of these two holes positioned along the center of the length and near the second edge of the width dimension;
    wherein for the second rectangular plate, a first of these two holes being positioned between the center and the first end along the length and near the first edge of the width dimension, a second of these two holes positioned between the center and the second end along the length and near the second edge of the width dimension; and
    wherein for the third rectangular plate, a first of these two holes being positioned between the center and the second end along the length and near the first edge of the width dimension, a second of these two holes positioned between the center and the first end along the length and near the second edge of the width dimension; such that the latch mechanisms do not interfere with one another when the stabilizing tripod set is in the second configuration.

2. The stabilizing weight set of claim 1, wherein each of the latch mechanisms comprising a smooth rod having a first bent end positioned on the respective bottom side of the respective plate, and each of the latch mechanisms having a coil spring captured by an enlarged head on a second end of each respective rod, positioned on the respective top side of the respective plate.

3. A set of three devices for stabilizing a tripod via parallel attachment to a first, a second, and a third leg of the tripod, the set of three devices comprising:
    a first, a second, and a third device, each of the first, second, and third of the three devices comprising:
        a plate having a heavy weight rectangular shape with a length, a width, a thickness, a top side, a bottom side, a long dimension having a first end, a center line and a second end, and a width dimension having a first edge and a second edge;
        two disparate holes, each of the two disparate holes having a diameter, and each of the two disparate holes extending vertically through the plate from the top side to the bottom side;
        two latch mechanisms extending through the two disparate holes;
        a first handle fixedly attached to the top side of the plate adjacent the first end; and
        a second handle fixedly attached to the top side of the plate opposite the first handle and adjacent the second end;
    a container for stacking each of the first, second, and third of the three devices;
    a first configuration wherein each of the first, the second, and the third of the three devices are attachably fixed to a respective one of the first, the second, and the third leg of the tripod via latching engagement of the respective two latch mechanisms with the respective one of the first, the second, and the third leg of the tripod; and
    a second stacking configuration wherein each of the first, the second, and the third of the three devices are stacked vertically upon one another within the container; and
    wherein the two disparate holes of the first device being located on the center line of the first device;
    wherein the two disparate holes of the second device being located alternately offset from the center line of the second device;
    wherein the two disparate holes of the third device being located alternately offset from the center line of the third device;
    wherein the alternate offset of the second device being opposite the alternate offset of the third device so that when the first, the second, and the third plates are stacked in any order within the container, none of the holes of any of the first, the second, and the third device line up vertically in the second stacking configuration.

4. The stabilizing weight set of claim 1, wherein each of the first, the second, and the third heavy weight device further comprising a first handle attached on the top of the respective plate near the first end, a second handle attached on the top of the respective plate near the second end; and each of the first and the second handle being perpendicular to the length of the plater.

5. The stabilizing weight set of claim 4, wherein a height of the first and the second handle each being greater than a height of half the respective two latch mechanisms; such that when the stabilizing tripod set is in the second stacking configuration the latch mechanisms do not interfere when the devices are verticality stacked.

6. A method for stabilizing a tripod or equipment stand, comprising:
   providing a set of three devices, each of the three devices being attachable and weighted, and each of the three devices comprising:
      a first, second, and a third plate constructed of solid material in a rectangular shape, each with a top surface and a bottom surface;
      two disparate holes, each of the two disparate holes having a diameter, and each of the two disparate holes extending vertically through the plate from the top surface to the bottom surface;
      two latch mechanisms, each of the two latch mechanisms extending vertically through a respective one of each of the two disparate holes;
      a first handle fixedly attached to the too surface of the plate adjacent a first end; and
      a second handle fixedly attached to the top surface of the plate opposite the first handle and adjacent a second end.

7. The method of claim 6 where each of the said weight plates has two quick release latches.

8. The method of claim 7 where the latches on each plate are located in staggered locations so that when the plates are stacked for storage in any order, the latches do not directly interfere.

9. The method of claim 8 where each plate includes a handle transversely mounted or formed on the top surface near each end, the height of said handles being predetermined to prevent interference from said latches when the plates are stacked for storage.

10. The stabilizing weight set of claim 1, wherein each of the latch mechanisms consisting of a smooth rod having a first bent end and a coil spring captured by an enlarged head on a second end said rod on the top side of the plate; another possible embodiment consisting of a threaded rod through the hole, bent at a right angle on the bottom side of the plate and a wing nut on the top side of the plate.

11. The stabilizing weight set of claim 1, wherein each of the first, the second, and the third heavy weight device further comprising a first handle formed on the top of the respective plate near the first end, a second handle formed on the top of the respective plate near the second end; and each of the first and the second handle being perpendicular to the length of the plate.

* * * * *